Patented May 28, 1940

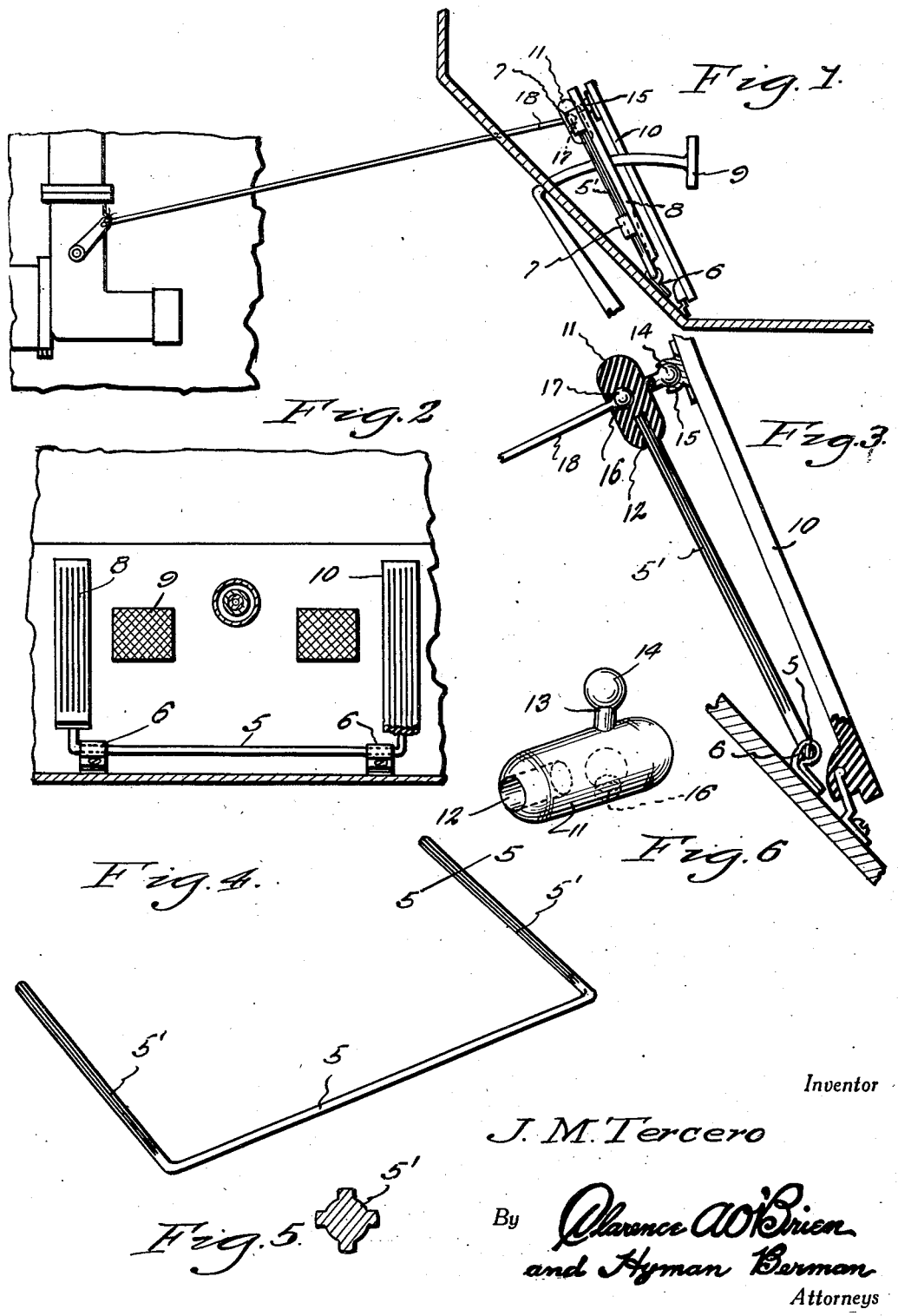

2,202,126

UNITED STATES PATENT OFFICE 2,202,126

DUAL ACCELERATOR

Jesús M. Tercero, Laredo, Tex.

Application October 6, 1939, Serial No. 298,314
In Mexico October 7, 1938

3 Claims. (Cl. 74—513)

The present invention relates to new and useful improvements in accelerator pedals for motor driven vehicles and has for its primary object to provide an auxiliary pedal adapted for use by the left foot of the driver and operatively connected with the regular accelerator pedal, which is actuated by the driver's right foot, in order that either foot may be employed for that purpose and thus relieve the right foot from the strain of constantly pressing on the accelerator during long periods of driving.

An important object of the present invention is to provide novel connection means between the two accelerator pedals.

A still further object is to provide a device of this character of simple and practical construction, which is efficient and reliable in use, relatively inexpensive to manufacture and install in operation and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which—

Figure 1 is a side elevational view of the assembled accelerator mechanism, mounted in the vehicle.

Figure 2 is a top plan view.

Figure 3 is a sectional view through the adaptor for connecting the auxiliary pedal to the main pedal.

Figure 4 is a perspective view of the connecting rod.

Figure 5 is a sectional view taken on the line 5—5 of Figure 4, and

Figure 6 is a perspective view of the adapter.

Referring now to the drawing in detail wherein for the purpose of illustration I have disclosed a preferred form of my invention, the numeral 5 designates a U-shaped connecting rod pivotally secured to the floor board of the vehicle by brackets 6. The ends of the rod are longitudinally channeled as shown at 5', one end of the rod being frictionally inserted in a pair of rubber blocks 7 secured to the under side of an auxiliary accelerator pedal 8, which is positioned adjacent the usual clutch pedal 9 for convenient use by the left foot of the driver, the other end of the rod being attached to the regular accelerator pedal 10 by an adapter coupling member designated generally at 11.

The adapter 11 is constructed of relatively hard rubber and is provided with a recess 12 in one end for snugly fitting on the end of the rod, and projecting laterally from one side of the adapter is a stem 13 having a ball 14 formed thereon to receive the socket member 15 of the pedal 10 of the accelerator, while at a diametrically opposite side of the adapter is a socketed recess 16 for receiving the ball 17 usually forming part of the accelerator rod 18. The adapter is thus interposed between the regular ball and socket of the accelerator pedal to provide a connection for the rod 5 which enables the use of either pedal in the accelerating operation.

Accordingly, when the right foot of the driver becomes tired through long periods of use, the left foot may be employed for actuating the accelerator.

It is believed the details of construction, advantages and manner of use of the device will be readily understood from the foregoing without further detailed explanation.

Having thus described the invention, what I claim is:

1. A dual accelerator for motor vehicles comprising a main accelerator pedal having a ball and socket operating connection, an auxiliary accelerator pedal, a U-shaped rod pivotally anchored at its intermediate portion to the floor of the vehicle, one end of the rod being secured to the auxiliary pedal and an adapter carried at the other end of the rod and interposed between the ball and socket connection of said main pedal.

2. A dual accelerator for motor vehicles comprising a main accelerator pedal having a ball and socket operating connection, an auxiliary accelerator pedal, a U-shaped rod pivotally anchored at its intermediate portion to the floor of the vehicle, one end of the rod being secured to the auxiliary pedal, a relatively hard rubber adapter having a recess in one end for snugly receiving the other end of said rod, a stem having a ball thereon projecting laterally from one side of the adapter and a socket at its diametrically opposite side for engagement by the companion parts of the ball and socket connection of said main pedal.

3. A dual accelerator for motor vehicles comprising a main accelerator pedal and an auxiliary accelerator pedal, said last named pedal having a plurality of rubber blocks secured to the underside thereof and each provided with an opening, a U-shaped rod pivotally anchored at its intermediate portion to the floor of the vehicle, said rod having longitudinally extending ribs on its end portions, one of the ends of the rod being frictionally inserted in the openings of said blocks, and a rubber adapter having a ball and socket connection with the main pedal, said adapter also being provided with an opening for frictionally receiving the other end of said rod.

JESÚS M. TERCERO.